United States Patent Office 3,207,305
Patented Sept. 21, 1965

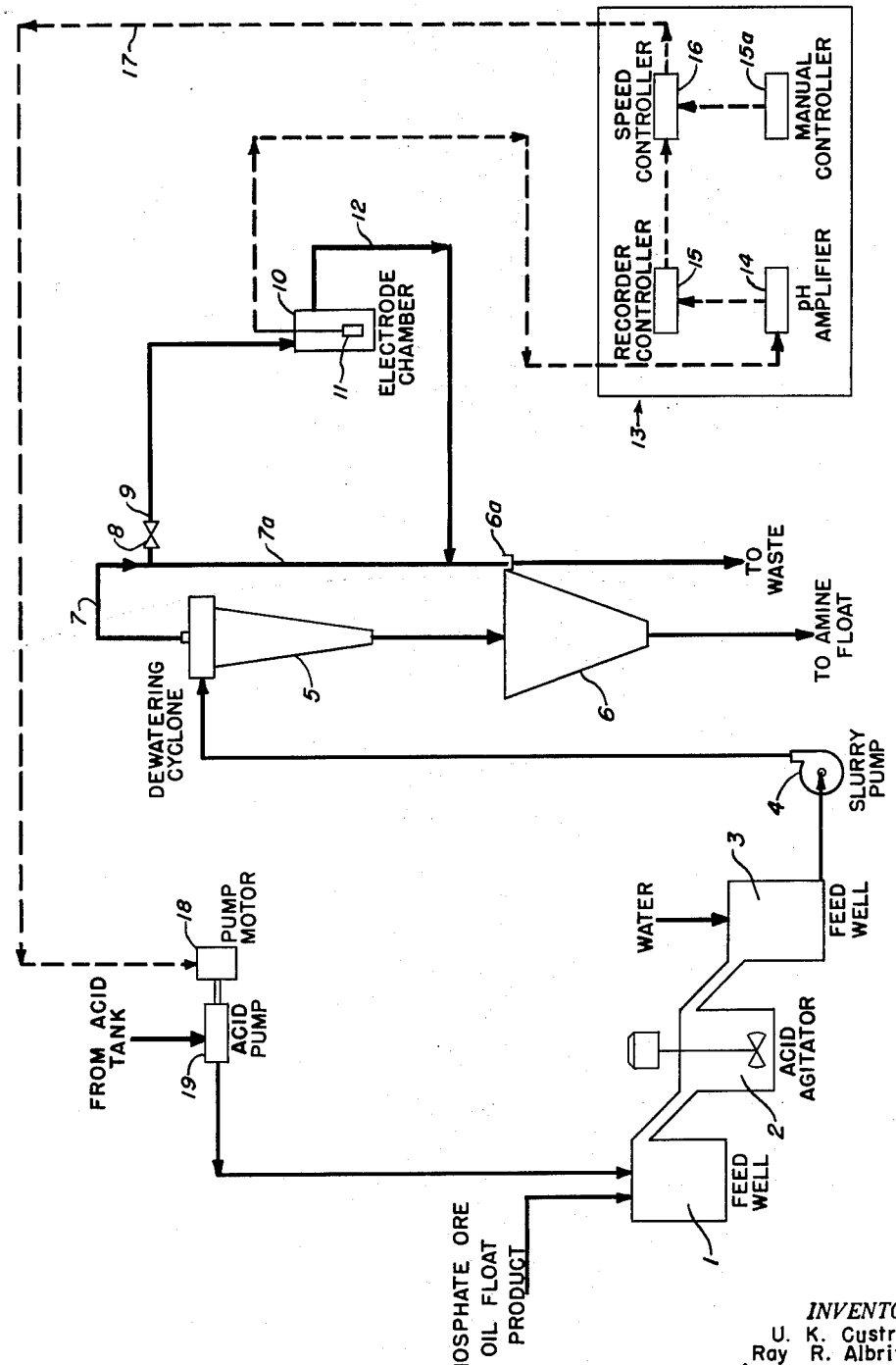

3,207,305
pH CONTROL IN ACID RINSE CIRCUIT IN FLOTATION OF PHOSPHATE ROCK
U. K. Custred, Lakeland, and Ray R. Albritton, Fort Meade, Fla., assignors to American Cyanamid Company, Stamford, Conn., a corporation of Maine
Filed May 18, 1962, Ser. No. 195,881
4 Claims. (Cl. 209—10)

The present invention relates to a method for beneficiating phosphate rock. More particularly, it relates to a method for regulating the addition of acid to an oil-phosphate float product. Still more particularly, the invention is concerned with a method for automatically regulating pH in the acid wash of an oil-phosphate float product so as to insure rapid removal or inactivation of flotation reagents present in the float product.

As is known, mined phosphate rock is initially subjected to a first flotation treatment whereby the bulk of the gangue is removed. This initial treatment comprises adding to an aqueous slurry of phosphate rock minor amounts of aqueous caustic solution, higher fatty acid, such as stearic, oleic or tall oil fatty acids and a fuel oil, usually conforming to the specification set forth in Commercial Standards C.S. No. 12–40 for Nos. 1, 2 or 3 Fuel Oils. Phosphate rock is floated to the surface and is continuously skimmed off. What remains as a sediment, is largely sand or other silica products.

Skimmed-off product is next treated with a concentrated mineral acid, such as sulfuric acid or hydrochloric acid, to remove or inactivate the caustic, higher fatty acid and fuel oil flotation reagents. Solids comprising phosphate rock are recovered by causing the latter to be separated from the liquid phase of the mixture.

Resultant solids are treated with a higher fatty acid amine and kerosene mixture, whereby solids, such as residual sand, rise to the top of the so-treated mixture and are skimmed off. The residue comprises treated phosphate rock which may be further processed for use in fertilizer formulations. Alternatively, the treated rock may be processed to obtain phosphoric acid and analogous products.

In the over-all process as described hereinabove, there remain troublesome problems in the treatment of the oil-float product with respect to concentrated mineral acid addition which causes the effective removal or inactivation of the initial flotation reagents. The pH of the oil-float product, unfortunately, cannot be readily and conveniently determined. In order to effect the removal of these flotation reagents practically and economically, it becomes necessary to accurately determine the quantity of acid to be added. Usually, a pH between 1.5 and 4 will accomplish this result. However, the incorporation of a pH electrode into a vessel containing the oil float product cannot result in accurate pH determination, for the reason that no homogeneity of the oil float product and acid is achieved. In the event, the mixture of oil-float product and acid is stirred, the pH electrodes, if inserted into the stirring mixture, become rapidly abraded, rendering inaccurate readings of pH. To obviate this difficulty, it became commonplace in the art to rely upon a skilled operator's observation of the oil-float product after adding what was thought to be a sufficient quantity of acid. To insure that sufficient acid was present, the operator would observe the condition of the surface of the oil float product. The addition of acid was terminated when a skim float was no longer observed. Inevitably, substantial excesses of acid were added with resultant increased costs and inefficiency of operation.

It is a principal object of the present invention to provide for acid addition to an oil-float product containing flotation reagents which is independent of the personal factor. It is a further object to provide for an automatic process whereby acid addition to an oil-float-phosphate product is supplied in amounts whereby reliable pre-set pH in the oil-float product to be treated is insured. Other objects and advantages of the invention will become apparent from a consideration of the detailed description following.

To this end, it has been found that the concentrated acid added to an oil-float product containing phosphate rock, can be automatically controlled and maintained within predetermined pH limits. In this manner, all rough flotation reagents can be removed without undue contamination of the oil-float product so-treated. This is accomplished by providing for the insertion of a pH electrode in a chamber positioned in a zone subsequent to the separation of substantial solids from an acidified, slurried flotation mixture. Accurate pH readings can then be recorded over a prolonged period, since the life span of the electrode is markedly increased. It is observed that rapid abrasion of the electrodes so-located does not occur.

The invention will be further described with reference to the accompanying drawing, the single figure of which is a flow sheet wherein a clarifying phosphate-ore plant embodying the principal features of the invention is diagrammatically illustrated.

An oil-float product is introduced into the vessel or feed well 1 into which concentrated sulfuric acid is added at a constant rate. Overflow is led into an acid agitator vessel 2 wherein the oil-float product and the acid are intimately mixed. From the latter vessel, overflow is next introduced into feed well 3. Sufficient water is added to establish a slurry of a proper solids-liquid ratio whereby approximately a 10% to 75% solids ratio is achieved. The slurry mixture is pumped by means of a slurry pump 4 to a liquid-solids separator, usually a dewatering cyclone 5. Separation of the solids from the liquid is readily achieved. Solids are then removed from the cyclone and introduced into a suitable separator 6 from which residual liquid can be withdrawn as an overflow in zone 6a, directly linked to line 7a. Phosphate rock product, essentially free from flotation reagents, is next withdrawn from the separator 6 and treated with a mixture of kerosene and fatty acid amine whereby the elimination of most of the gangue is achieved. However, the liquid portion eliminated from the cyclone 5 is continuously sampled from line 7 and fed through an appropriate valve 8 and finally through line 9 into a chamber 10, containing a pH electrode 11. Overflow therefrom is next cycled through line 12 to line 7a, and finally eliminated as waste. The electrode 11 is wired or otherwise linked to a pH sensor apparatus. The electrode as described above is directly wired to a pH automatic sensor 13 comprising pH amplifier 14 wired to a recorder controller 15 which automatically relays the sensed information to a speed controller 16 directly linked by means of wire 17 to a pump motor 18. The latter, in turn, regulates the quantity of acid, obtained from a storage tank, not illustrated, which is pumped into the system initially by means of an acid pump 19. The activation of the pump motor causes the acid thereby to be either more slowly or more rapidly introduced into the system depending upon the over-all pH variations which are not entirely dependent upon the specific pH of the oil-float product to be treated. As an alternative procedure, a manual controller 15a may be substituted for the automatic controller in the event the recorder controller is not functioning properly.

In order to facilitate a further understanding of the invention, the following example is presented primarily for the purpose of illustrating certain more specific details thereof. The scope of the invention is not to be deemed limited thereby except as defined in the claims. Unless otherwise stated, the parts are by weight.

Example

Phosphate ore-oil-float product containing 2000 parts of phosphate rock and a mixture of 0.5 part of sodium hydroxide, 1.5 parts of tall oil fatty acid and 4.7 parts of fuel oil (Commercial Grade No. 2) along with residual sand, is introduced continuously into a feed well at the rate of 2000 parts per hour. As the oil-float product is introduced into the feed well zone, 3 parts of concentrated sulfuric acid per hour are gradually fed into the feed well. Overflow into an acid agitator zone is permitted so that the acidified mixture can be properly admixed. Overflow from this vessel is then introduced into a suitable feed well zone to which water is added to establish a solids-liquid ratio approximating 25 parts of solids per 100 parts of liquid.

The so-slurried mixture is then withdrawn from the bottom of the latter vessel and pumped to a dewatering cyclone from which solids are withdrawn in the bottom section thereof and liquid is withdrawn from its uppermost section. The liquid is next fed to a chamber containing a pH electrode. The latter electrode is directly wired to a sensor apparatus comprising a pH amplifier, a recorder controller and a speed controller.

The addition of three parts of sulfuric acid is sufficient to maintain the pH at between about 3 and 3.5 in the first hour of operation.

In a second hour of operation, the pH increases to approximately 4.5 indicating that the phosphate rock oil-float product contains an increased amount of alkaline material which requires additional acid to reduce the pH to the desired predetermined level. The sensor apparatus notes this discrepancy, for the reason that the recorder controller has been previously set to a pH of 3.25. The speed controller which is directly linked to a motor pump regulating the quantity of acid introduced into the first feed well zone, is automatically sped up so as to introduce additional acid sufficient to depress the pH of the feed material introduced.

Advantageously, reliance upon operators' observation of the condition of the oil-float product is reduced by following the procedure of the present invention. Constant pH of the acidified oil-float product containing the phosphate ore can be readily accomplished. Hence, over a six months period, for instance, a saving of some 25% per 2000 parts of feed material treated has been observed. In short, the process of the invention affords an economical, efficient and straightforward procedure for treating a phosphate rock-oil-float product prior to its utilization in the manufacture of, for instance, valuable phosphate fertilizers.

We claim:
1. In a process for regulating and controlling the addition of a concentrated mineral acid to establish a pH range between 1.5 and 4 of an unclarified phosphate rock-oil float product of pH greater than 4, and from which the bulk of the gangue has been removed, said product containing a mixture of minor amounts of flotation reagents comprising an alkali metal hydroxide, a higher fatty acid and fuel oil, together with major amounts of the unclarified phosphate ore to be treated, adding sufficient acid thereto, agitating the so-acidified mixture so as to neutralize and otherwise inactivate the said flotation reagents, adding sufficient water to adjust the solids-liquid ratio of resultant phosphate rock-oil float product, and separating the phosphate rock solids from the liquid, the improvement which comprises: continuously and automatically determining the pH of the latter mentioned clarified liquid so-obtained by the separation of phosphate rock solids from said liquid, introducing a mineral acid to unclarified phosphate rock-oil float product to be initially treated, and thereafter adjusting and maintaining the pH level between 1.5 and 4 of said unclarified rock-oil float product by an appropriate pH sensor, said sensor correlating the pH of said unclarified phosphate rock-oil float product with the pH of said clarified liquid.

2. The process according to claim 1, in which the acid is sulfuric acid.

3. The process according to claim 1, in which the solids-liquid ratio is established at between about 10 to 75 parts of solids per 100 parts of liquid.

4. The process according to claim 1, in which the phosphate rock solids are cyclonically separated from admixed liquids.

References Cited by the Examiner

UNITED STATES PATENTS

| | | | |
|---|---|---|---|
| 1,450,023 | 3/23 | Edelman | 137—92 XR |
| 2,691,442 | 10/54 | Wallach | 209—1 |
| 3,032,197 | 5/62 | Northcott | 209—166 |

OTHER REFERENCES

Anderson: Rock Products, vol. 56, No. 12 (December 1953), pp. 94–6.

Lawver: Min. Eng., vol. 5, No. 10 (October 1953), pp. 982–4.

HARRY B. THORNTON, *Primary Examiner.*

HERBERT L. MARTIN, *Examiner.*